(12) United States Patent
Vanderhook et al.

(10) Patent No.: US 12,125,063 B2
(45) Date of Patent: *Oct. 22, 2024

(54) CONNECTED/AFFILIATED HOUSEHOLD TARGETING

(71) Applicant: VIANT TECHNOLOGY LLC, Irvine, CA (US)

(72) Inventors: Timothy C. Vanderhook, Newport Beach, CA (US); Jason J. A. Knapp, Solana Beach, CA (US); Brian C. DeFrancesco, Trabuco Canyon, CA (US)

(73) Assignee: VIANT TECHNOLOGY LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,891

(22) Filed: May 26, 2022

(65) Prior Publication Data

US 2022/0284477 A1    Sep. 8, 2022

Related U.S. Application Data

(63) Continuation of application No. 14/743,034, filed on Jun. 18, 2015, now Pat. No. 11,367,106.

(60) Provisional application No. 62/014,601, filed on Jun. 19, 2014.

(51) Int. Cl.
G06Q 30/02    (2023.01)
G06Q 30/0251    (2023.01)
G06Q 50/00    (2012.01)

(52) U.S. Cl.
CPC ......... *G06Q 30/0261* (2013.01); *G06Q 50/01* (2013.01)

(58) Field of Classification Search
CPC .......................... G06Q 30/0261; G06Q 50/01
See application file for complete search history.

(56) References Cited

U.S. PATENT DOCUMENTS

| | | | |
|---|---|---|---|
| 9,286,397 B1 | 3/2016 | Suleman et al. | |
| 9,674,751 B2 * | 6/2017 | Maguire | H04W 12/068 |
| 2012/0215610 A1 * | 8/2012 | Amaro | G06Q 30/02 |
| | | | 705/14.51 |
| 2012/0259705 A1 | 10/2012 | Monteverde | |
| 2013/0080526 A1 | 3/2013 | Gill et al. | |
| 2013/0151527 A1 * | 6/2013 | Bruich | G06F 16/9535 |
| | | | 707/737 |
| 2014/0046777 A1 * | 2/2014 | Markey | G06Q 30/02 |
| | | | 705/14.66 |
| 2014/0136333 A1 | 5/2014 | Shoshitaishvili et al. | |
| 2014/0344057 A1 * | 11/2014 | Massoudi | G06Q 30/0251 |
| | | | 705/14.58 |

* cited by examiner

*Primary Examiner* — John Van Bramer
(74) *Attorney, Agent, or Firm* — Gates & Cooper LLP (57) ABSTRACT

A method, system, apparatus, and computer program product provide the ability to utilize household connections. A device is associated with a primary household. The primary household is connected with one or more additional households. Within a primary household profile, identification information (for the one or more additional households that are connected to the primary household) are stored. Media content based on data associated with the primary and connected households is then targeted.

20 Claims, 6 Drawing Sheets

HOUSEHOLD A PROFILE
CONNECTED HOUSEHOLDS
1st Degree
  HOUSEHOLD B
2nd Degree
  HOUSEHOLD C HOUSEHOLD B PROFILE
CONNECTED HOUSEHOLDS
1st Degree
  HOUSEHOLD A
  HOUSEHOLD C
2nd Degree HOUSEHOLD C PROFILE
CONNECTED HOUSEHOLDS
1st Degree
  HOUSEHOLD B
2nd Degree
  HOUSEHOLD A

CONNECTED/AFFILIATED HOUSEHOLD TARGETING

CROSS-REFERENCE TO RELATED APPLICATIONS

This application is a continuation under 35 U.S.C. § 120 of application Ser. No. 14/743,034, filed on Jun. 18, 2015, with inventor(s) Timothy C. Vanderhook, Jason J. A. Knapp, and Brian C. DeFrancesco, entitled "CONNECTED/AFFILIATED HOUSEHOLD TARGETING," which application is incorporated by reference herein, and which application claims the benefit under 35 U.S.C. Section 119(e) of the following commonly-assigned U.S. provisional patent application(s), which is/are incorporated by reference herein Provisional Application Ser. No. 62/014,601, filed on Jun. 19, 2014, by Timothy Charles Vanderhook, Jason J. A. Knapp, and Brian C. DeFrancesco, entitled "Connected/Affiliated Household Targeting,".

This application is related to the following commonly-assigned patent application(s), which application(s) are incorporated by reference herein:

U.S. patent application Ser. No. 14/223,676, filed on Mar. 24, 2014 (now U.S. Pat. No. 8,996,727 issued on Mar. 31, 2015), by Brian C. DeFrancesco, Timothy C. Vanderhook, and Christopher J. Vanderhook, entitled "Internet Connected Household Identification for Online Measurement & Dynamic Content Delivery";

U.S. patent application Ser. No. 13/895,587, filed on May 16, 2013 (now U.S. Pat. No. 9,331,921 issued on May 3, 2016), by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY"; and U.S. provisional patent application Ser. No. 61/648,341, filed on May 17, 2012, by Brian C. DeFrancesco, Timothy C. Vanderhook, and Christopher Vanderhook, entitled "INTERNET CONNECTED HOUSEHOLD IDENTIFICATION FOR ONLINE MEASUREMENT & DYNAMIC CONTENT DELIVERY".

BACKGROUND OF THE INVENTION

1. Field of the Invention

The present invention relates generally to advertising, and in particular, to a method, system, apparatus, and article of manufacture to connect multiple households and allowing one household's attributes to influence the targeting and reporting of another household.

2. Description of the Related Art

Advertisement revenue is commonly dependent on the ability to target a particular demographic group and/or delivering an advertisement to a specific consumer or type of consumer (i.e., a consumer within a particular category/demographic category). With digital/electronic based advertising (e.g., on the Internet), the ability to categorize and identify a consumer may be based on a variety of factors such as the geographic location of the consumer, websites visited by the consumer, prior purchases of the consumer, etc. Consumers often utilize a variety of devices such as computers, tablet devices, cellular phones, etc. when browsing the web. Prior art systems have attempted to identify/associate a particular device with a user or a demographic group based on a variety of factors (e.g., whether a particular device is associated with or being used at a household or a business). Based on the determination of a variety of factors/attributes of a device/consumer, advertisements may be sold/provided/targeted. While prior art systems may attempt to identify/associate devices with a particular household as part of the device/consumer identification process, prior art systems have not attempted to influence the advertisements delivered (to such a user) based on other/nearby households or households the user has visited.

SUMMARY OF THE INVENTION

Embodiments of the invention provide the ability to connect households (e.g., a primary household with additional households) based on visits of users between multiple households and/or based on social media connections/interactions. Data associated with users from a connected household may then be used to target content (e.g., advertising or other media content) to a user within a primary household. The degrees of separation between households may also be determined and tracked. Advertisers/media content providers may then target households by attributes of their $1^{st}$, $2^{nd}$, $3^{rd}$, degree connections. Advertisers/media content providers may have the option of filtering/selecting particular degrees of separation that may be utilized in such targeting. Reporting based on delivered advertising/media content may also be provided (e.g., with metrics/attributes relating to the reach of an advertiser/content provider).

In view of the above, embodiments of the invention take into consideration that word of mouth is a powerful tool for advertisers and if people can be reached within several degrees of separation, an advertiser's message may be spread (e.g., similar to viral based information). Such capabilities provide more scale and reach (compared to targeting/reporting that does not utilize household connections) as additional data for targeting attributes are acquired. In this regard, targeting and advertising across household boundaries enable advertisers and content providers to capture both household influence as well as community influence.

In addition to the above, similar capabilities may be provided for devices (and not just households). In this regard, connections between devices may be identified and used to provide targeting and reporting.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to connect households together as well as targeting and reporting beyond the primary household extending to multiple degree connections. Embodiments may intelligently identify which households are connected to teach other and in what degree (e.g., $1^{st}$, $2^{nd}$, $3^{rd}$, etc.).

Definitions

Households (HH)

A household includes all the persons who occupy a housing unit. A housing unit is a house, an apartment, a mobile home, a group of rooms, or a single room that is occupied (or if vacant, is intended for occupancy) as separate living quarters. Separate living quarters are those in which the occupants live and eat separately from any other persons in the building and which have direct access from the outside of the building or through a common hall. The occupants may be a single family, one person living alone, two or more families living together, or any other group of related or unrelated persons who share living arrangements.

Internet Connected Household (ICH)

An internet connected household is a household that uses the Internet at home. The US Census Bureau reports there are 81,939,000 households that use the Internet at home (internet connected households) in the United States. Source: U.S. Census Bureau, Current Population Survey, October 2009.

Internet Service Provider (ISP)

An ISP is a company that supplies Internet connectivity to home and business customers. ISPs support one or more forms of Internet access, ranging from modem dial-up to DSL (digital subscriber line) and cable modem broadband service to dedicated T1/T3 lines to satellite or wireless access.

Internet Protocol Address (IP)

An IP address is a logical address for a network adapter. Generally speaking, an IP address uniquely identifies computers on a TCP/IP network (transmission control protocol/Internet protocol network).

An IP address can be private—for use on a local area network (LAN)—or public—for use on the Internet or other wide area network (WAN). IP addresses can be determined statically (assigned to a computer by a system administrator) or dynamically (assigned by another device on the network on demand).

Two IP addressing standards are in use today. The IPv4 standard is most familiar to people and supported everywhere on the Internet, but the newer IPv6 standard is planned to replace it and is starting to be deployed.

IPv4 addresses consist of four bytes (32 bits). Each byte of an IP address is known as an octet. Octets can take any value between 0 and 255. Various conventions exist for the numbering and use of IP addresses.

Transmission Control Protocol/Internet Protocol (TCP/IP)

TCP/IP is the communication protocol for the Internet. A computer communication protocol is a description of the rules computers must follow to communicate with each other. TCP/IP defines how electronic devices (like computers) should be connected to the Internet, and how data should be transmitted between them. Each computer must have an IP address before it can connect to the Internet and each IP packet must have an address before it can be sent to another computer.

Hypertext Transfer Protocol (HTTP)

The Hypertext Transfer Protocol provides a standard for Web browsers and servers to communicate. HTTP is an application layer network protocol built on top of TCP. HTTP clients (such as web browsers) and servers communicate via HTTP request and response messages.

Ad Impression (Impression)

An ad impression (or advertisement impression), sometimes called a view or an ad view, is a term that refers to the point in which an ad is viewed once by a visitor, or displayed once on a web page/app. As used herein, an impression refers to the "space" (e.g., screen space) on a website, application, app, display device, etc. where an advertisement is typically displayed.

Browser

Short for web browser, a software application used to locate, retrieve and also display content on the World Wide Web, including webpages, images, video and other files. As a client/server model, the browser is the client run on a computer that contacts the web server and requests information. The web server sends the information back to the web browser which displays the results on the computer or other Internet-enabled device that supports a browser. Popular examples include: MOZILLA'S FIREFOX™, MICROSOFT'S INTERNET EXPLORER™, GOOGLE'S CHROME™, AND APPLE'S SAFARI™.

Browser Window

A window is an area on the screen that displays information for a specific program. This often includes the user interface graphical user interface (GUI) as well as the program content. Windows are used by most applications as well as the operating system itself. A typical window includes a title bar along the top that describes the contents of the window, followed by a toolbar that contains user interface buttons. Most of the window's remaining area is used to display the content.

The top of a typical web browser window contains a title bar that displays the title of the current page. Below the title is a toolbar with back and forward buttons, an address field, bookmarks, and other navigation buttons. Below the toolbar is the content of the current web page. The bottom of the window may contain a status bar that displays the page loading status.

App

An "app" is application software that causes a computer to perform useful tasks. A mobile app is software designed to run on smartphones, tablet computers, and other mobile devices. As used herein, an app refers to both mobile and non-mobile based apps.

Website

A website (or client-side website) is a set of interconnected webpages, usually including a homepage, generally located on the same server, and prepared and maintained as a collection of information by a person, group, or organization.

Webpage

A document on the World Wide Web, consisting of an HTML file and any related files for scripts and graphics, and often hyperlinked to other documents on the web. The content of webpages is normally accessed by using a browser.

Frequency

Frequency refers to the number of impressions shown to a household within a time period.

Gross Rating Point (GRP)

GRP is a calculation of the percent reached (e.g., via delivery of impressions) of the United States population times the frequency.

Cost Per Point (CPP)

CPP is traditionally a measure of the cost of different outlets. As used herein, CPP is calculated as the "cost per rating point" as the budget (i.e., the advertising budget) divided by GRP.

Outlet or Media Outlet

An outlet or media outlet is the mechanism/medium through which an advertisement will be presented. Different outlets possess different characteristics and not all outlets are equally effective for advertisers. Media outlets may include (but are not limited to) television, radio, print publications, Internet, direct mail, signage, product placement, mobile devices, sponsorships, etc.

Hardware Environment

Figure 1:
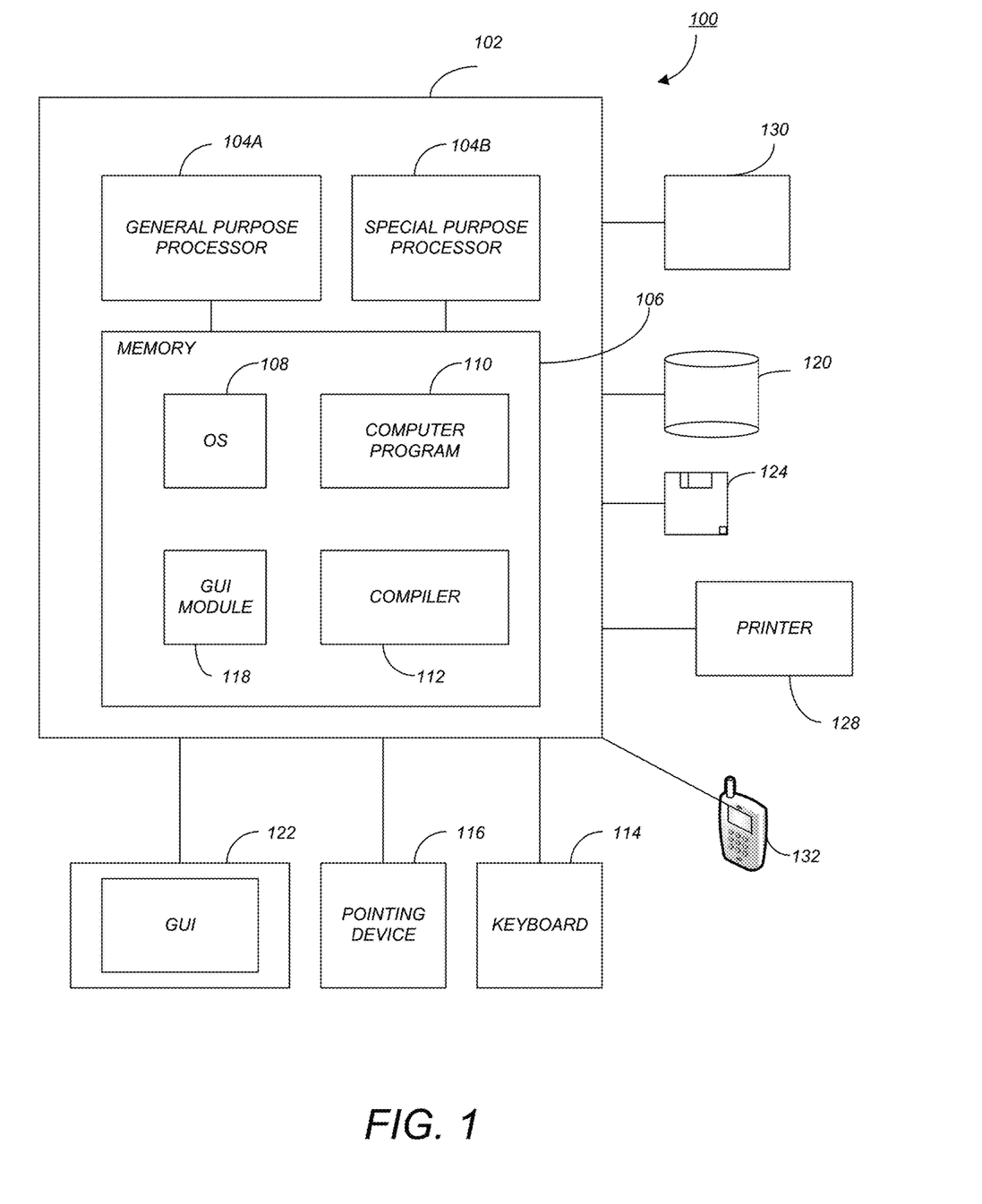
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD™, NOOK™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 players, NINTENDO 3DS™, PLAYSTATION PORTABLE™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA™, PERL™, BASIC™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein.

Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
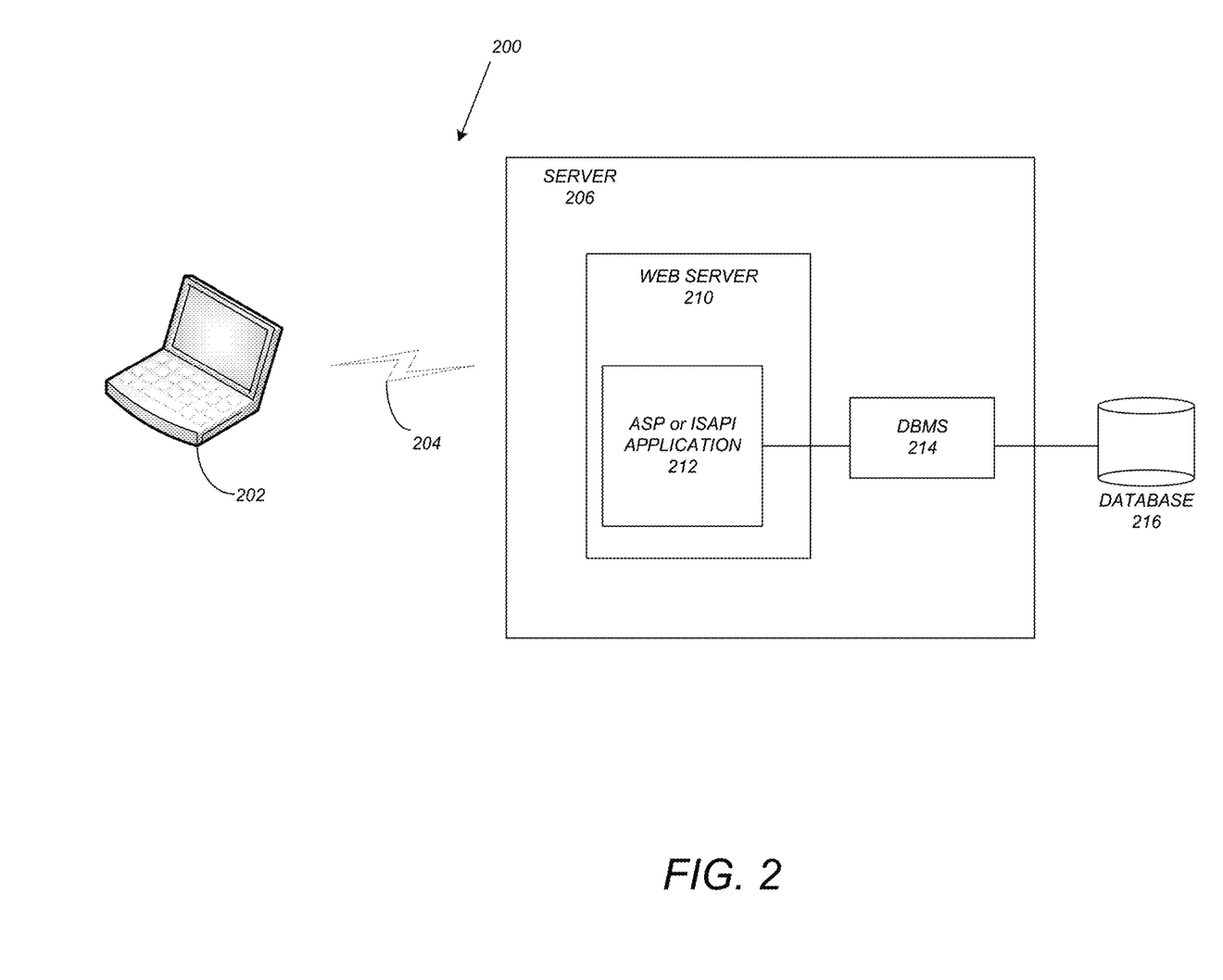
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Social Network Configuration

Embodiments of the invention are implemented as a software application on a client 202 or server computer 206. Further, as described above, the client 202 or server computer 206 may comprise a thin client device or a portable device that has a multi-touch-based display (i.e., a tablet device), a mobile phone, a gaming system, an IP (internet protocol) enabled television, a television set top box, or other internet enabled device running on various platforms and operating systems. Users may communicate and interact with the software application using a mobile device, client computer 202, portable device, etc.

Figure 3:
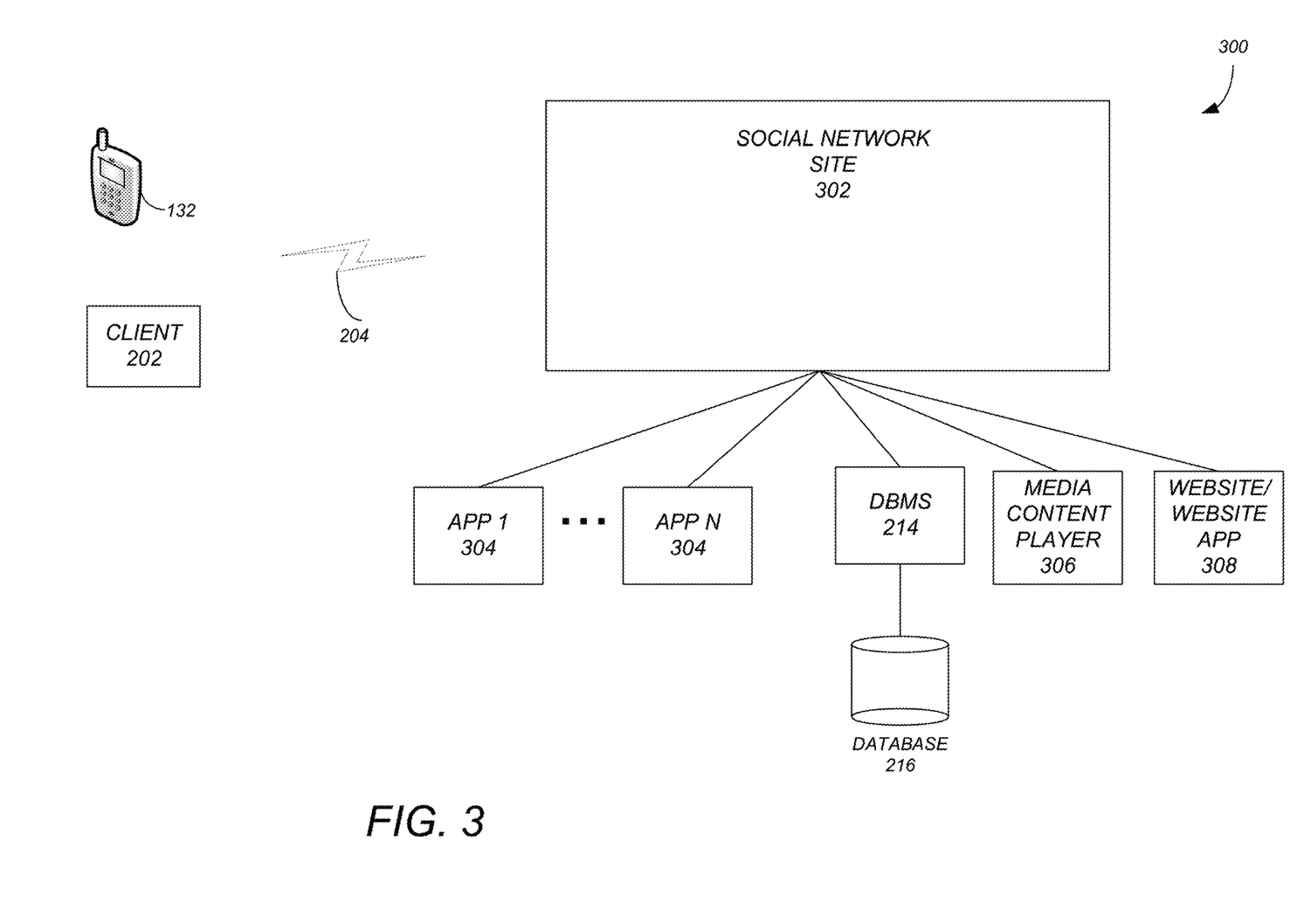
FIG. 3 illustrates the general structure and interaction within a social media network framework/system in accordance with one or more embodiments of the invention.

FIG. 3 illustrates the general structure and interaction within a social media network framework/system in accordance with one or more embodiments of the invention. As described above, mobile device 132 and/or client 202 (also referred to herein as user 202) may communicate and interact using a variety of networks 204 with various websites and applications. Mobile application software (commonly referred to as an "app") may be installed and/or utilized on mobile devices 132 and/or clients 202. Such an app may be downloaded from an application marketplace or online store of applications. The app may be used to provide the functionality herein. In addition, various apps may be used in combination with server side applications to provide the desired functionality. For example, a user 202/132 may install an app on his/her smart phone or tablet device (e.g., IPAD™) that is configured to communicate with a social network site 302 and display relevant information on the user's device. Information displayed via the app on the user's device may be pushed to the user's device or pulled from the site 302 depending on the configuration of the app.

On the server side 206, a social network site 302 (e.g., MYSPACE™, FACEBOOK™, LINKEDIN™, FRIENDSTER™, TWITTER™, FOURSQUARE™, PINTEREST™, INSTAGRAM™, etc.), may provide an interactive experience to a variety of users 202/132 that access such a social network site 302. Users 202/132 may access social network site 302 via a web browser or via an app on the user's device.

Users 202/132 accessing a social network site 302 may be members of site 302 or may access information without being members. In this regard, access to a site 302 or certain areas of site 302 may be limited to users 202/132 that are members and are logged in to such a site 302. Such a logon may be automatic (e.g., preconfigured using cookies on a web browser or by storing a username/password on the user's device or in the app on the user's device).

Either as part of the social network site 302 or executing separately from the social network site 302, various applications 304-308 may be used to provide additional features to the social network site 302. It may be noted that the description is not limited to the applications depicted in FIG. 3 and additional applications may be used to provide the features described herein. Further, such applications 304-308 may be directly integrated with (e.g., are an integral part of) social network site 302, may interact with each other, and or may interact directly with the user 202/132.

Apps 304 may provide a variety of functionality ranging from games, to facial recognition, to media content discovery, etc. For example, one app 304 may consist of a recommendation engine that is configured to recommend content, events, etc. to a user 202/132 (e.g., based on content gathered and/or stored by social network site 302). DBMS 214 manages all of the data that may be stored in database 216. Media content player 306 enables the ability to view media content uploaded by users 202/132 (or uploaded by a host of site 302). Websites/website apps 308 are websites other than the social network site 302 (e.g., TWITTER™, search engines, map-based interactions, etc.) that may use information from social network site 302 or provide additional information based on the social network information.

The platform and processing capabilities that provide an integrated graphical user interface that displays connectivity status and affinity between users/objects and may be performed by client 202, server 206, and/or a combination of client 202 and/or server 206 within a social network 302.

As used herein, a "social network" (or social network site 302) refers to a platform or service (e.g., website, web service, application, etc.) that enables users to build social relations based on shared interests, activities, backgrounds, and/or real-life connections. A social network 302 provides a representation of each user (e.g., a profile), his/her social links, and a variety of additional services. As described above, many social networks/sites 302 are web-based and provide means for users to interact over a network 204 (e.g., the Internet, e-mail, and instant messaging). Social networking sites 302 allow users to share ideas, pictures, posts, activities, events, and interests with people in their network. Further, social networking sites 302 provide an electronic/computer-implemented means/representation of a social structure made up of a set of social actors (e.g., individuals or organizations) and a set of connections between such actors. In addition to providing the ability for users to connect to one-another, a social network 302 may also enable users to connect with groups (e.g., music groups), objects, locations, etc. However, embodiments of the invention are not intended to be limited to the social networks 302 described above but are intended to cover any type of social network 302 where users can connect/communicate with one another and objects via electronic means.

Home Influence

Consumers such as family and friends can often influence other consumers. Embodiments of the invention provide the ability to capture and utilize such influence. In this regard, embodiments of the invention recognize that family and friends may visit each other's households. Such visits may be formally recognized and recorded into a format that can then be utilized to target individuals based on their household connections as well as reporting on such visitation/degrees of separation from an originating household. Such capabilities provide new revenue opportunities by providing advertisers with more targeting options. Advertisers are provided with the ability to target households by attributes of their $1^{st}$ degree, $2^{nd}$ degree, $3^{rd}$ degree, etc. connections. Such capabilities take into consideration that word of mouth is a very powerful tool for advertisers and if people within several degrees of separation can be reached, their advertiser's message can be spread.

To fully take advantage of the influence users have with respect to each other, embodiments of the invention may establish three requirements: (1) connecting households; (2) targeting/targeting options; and (3) reporting.

Connecting Household

The first requirement/step that enables advertisers and other entities to take advantage of the influence of users (with respect to each other) is that of connecting households. To connect households, one must initially recognize/determine whether a device/user is at/part of a household. Household determinations may be established using a variety of mechanisms including the methods and systems described in the patent applications cross-referenced above. For example, if the IP address from which an HTTP request originates is associated with an ISP that provides residential service, a particular IP address may be associated with a household. Similarly, if the number/type/time of HTTP requests are associated with requests typically received from a household (versus that of a business), the IP address where the HTTP requested originated may be identified as a household.

Numerous different households may be identified in such a manner. Once a household determination has been made with respect to several different households, the issue arises regarding how to connect two or more households together. Connecting random households together provides little to no benefit due to the lack of influence between randomly selected households/users. Thus, embodiments of the invention attempt to utilize attributes/features that are related/in common between two (or more) households to determine when/if to connect two households together. Household connections are established based on the devices used within/by such households/household networks. Attributes/features that may be used to connect households include IP address visits (by devices) and social network connections/relationships.

IP address visits refer to the receipt of an HTTP request from a device at a second IP address when HTTP requests are commonly received from that device at a first/different IP address. In other words, a user/device commonly belongs to and/or issues HTTP requests from a particular household/IP address (referred to herein as a "home household"). When that device visits/connects to another household/network (e.g., a new household's wireless network) and requests web content (e.g., issues an HTTP request), the new request's originating IP address is likely different from the home household IP address. Such a difference may be recognized to determine a new/visiting device is issuing requests. For example, if a different ISP is receiving the request, an application installed on an ISP's server may recognize a request originating from a new device. Alternatively, a local network router/application may recognize new devices. In yet another embodiment, the receiving web server (i.e., that is hosting a website) may receive the request and recognize/analyze IP requests received from devices (i.e., recognize the device itself via cookies, user IDs [e.g., for websites that may require registration/login], etc.) and recognize that the web request is originating from a different IP address.

Once an IP address has been identified, the home household associated with a device may be deemed "connected" with the new household. Thus, households are connected based on the IP addresses associated with users visiting other households.

Household may also be connected via social network connections/relationships. Social network connections/relationships refer to relationships between users (utilizing a device). Such relationships may include MYSPACE™ connections, FACEBOOK™ friends, TWITTER™ followers, etc. For example, a user's home household may be "connected" to a household associated with a user's connections/friends/etc.

In addition to the above, household connections may be established based on the location of a mobile device. For example, a mobile device (e.g., a cellular phone, tablet, etc.) may be commonly associated with a particular street address (e.g., the user's home address and/or business address). If/when the mobile device is located within/adjacent/nearby another household (e.g., based on GPS [global positioning satellite], cellular triangulation, or other method for identifying the location of the device), that device's/user's home household may be deemed "connected" with the new household.

In yet another embodiment, a user may login to a user account utilizing a public computer (e.g., at a library, web kiosk, airport ticket kiosk, DVD rental kiosk [e.g., a Redbox™ rental location], etc.). The user's home household may be deemed "connected" with the household of nearby users or users having attributes in common with the user. For example, via an airline ticket kiosk/network, it is determined that a user is traveling to the same location as another user (along with other attributes in common such as similar hometowns, number of kids, etc.), the two user's households may be connected to each other. Similarly, if two users rent the same movie (as determined via a DVD rental kiosk/network, satellite/cable television subscription network, etc.), the households of the two users may also be deemed connected. When utilizing secondary data points/factors (such as traveling locations, similar movie tastes, etc.) to connect households/users, embodiments of the invention may require a minimum threshold of common attributes before establishing the connection. For example, simply renting the same movie may not be sufficient to establish a connection. Alternatively, if two users rented ten of the same movies and live in the same neighborhood, sufficient commonality may exist. Alternatively, multiple data points from different connections/networks may be used/combined together to establish a connection (e.g., utilize common factors from an airline frequent flier program/network and a DVD rental network [e.g., Redbox™], and/or a cable/satellite television network, etc.).

To maintain/persist the connections between households, embodiments of the invention provide for data storage. Referring to FIGS. 1 and 2, data may be stored in a database 216 (e.g., maintained via server 206 (via DBMS 214) or may be stored locally at each client 202 (e.g., within a data storage device 120 or on a hard drive or persistent memory within computer 100).

In embodiments of the invention, an IP profile of each household (referred to as "Household IP Profile") may be maintained. Within each Household IP Profile, all of the households connected to that household are stored. Connections may also be stored by their degree of separation. Thus, either at a centralized database or locally at each home household, a Household IP Profile is stored. The profile identifies connected households and the degrees of separation from the home household. Table 1 below illustrates an example of the information that may be stored in a Household IP Profile in accordance with one or more embodiments of the invention:

TABLE 1

| Household IP Profile for Household B | |
|---|---|
| Degree of Separation | Household ID |
| 1 | Household A |
| 1 | Household C |
| 2 | Household D |

The timing regarding when the connections are established/removed and when connections are stored may also be defined. For example, connections may commence (e.g., first stored or first established) with the first visit from a device/user to another IP address. Alternatively, connections may be established based on the performance of an indexing operation or a procedure where the user's social network connections/friends are examined and/or IP connection/browsing history are reviewed.

Different eviction policies may be implemented that specify/provide for when a household connection is removed (e.g., from the Household IP profile). For example, if a user has not interacted with a friend on a social network and/or has not connected to an IP address within a defined time period, that household may be removed/evicted from the list of connected households (e.g., the Household IP Profile). Alternatively, if a connection is manually removed from a social network (e.g., the user de-friends or hides another user's posts), such a manual operation may also trigger the eviction of that Household ID from the Household IP Profile.

Figure 4:
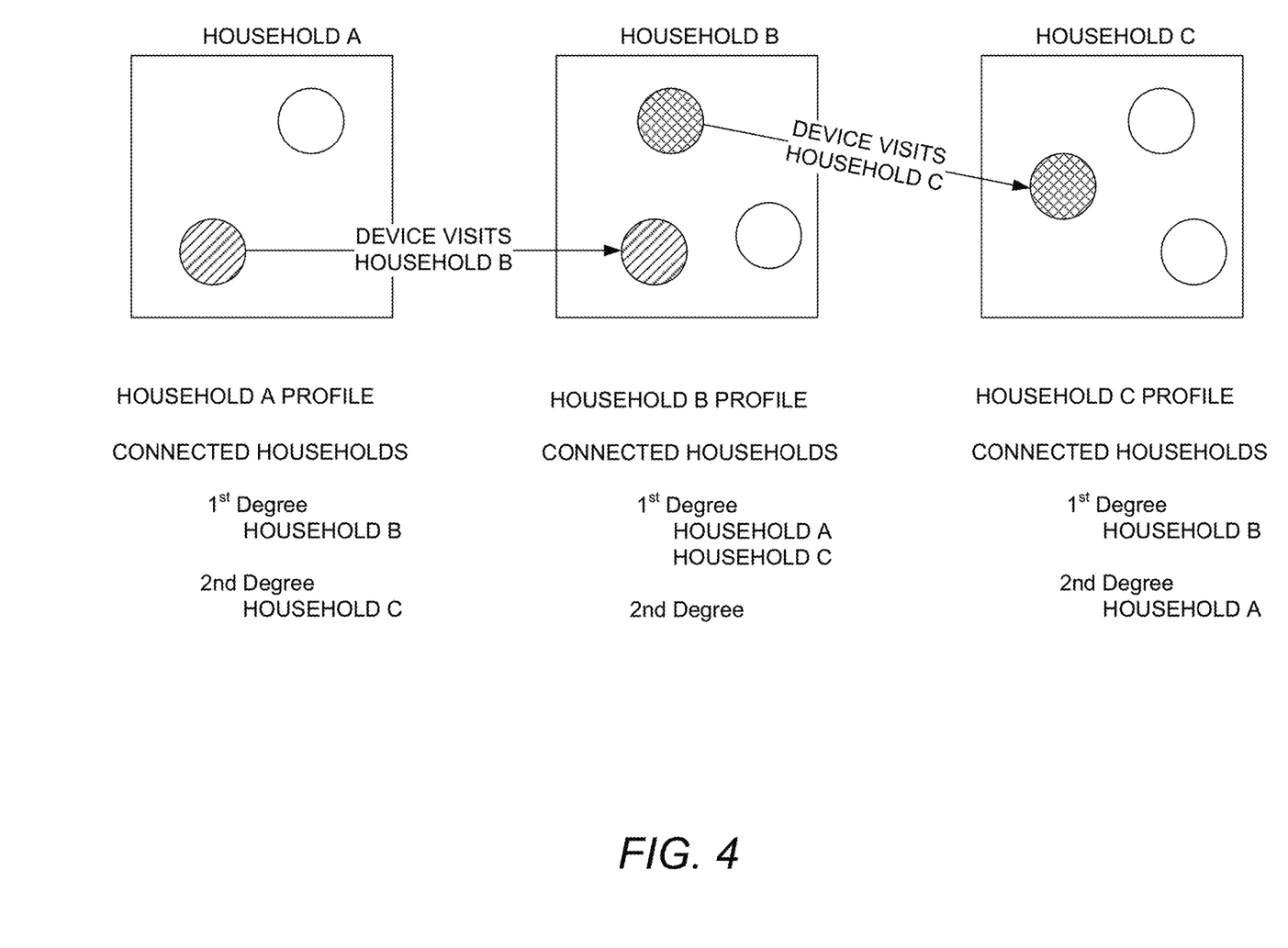
FIG. 4 illustrates an exemplary diagram of households and their connections in accordance with one or more embodiments of the invention.

FIG. 4 illustrates an exemplary diagram of households and their connections in accordance with one or more embodiments of the invention. A device from household A has visited Household B. Similarly, a device from Household B has visited Household C. Each household profile identifies the connected households and the degrees of separation for each connected household. Thus, as a device from Household A has directly visited Household B, Household B is a connected household with 1 degree of separation. However, as no device from Household A has directly visited Household C, Household C is not connected to household A in a $1^{st}$ degree. Instead, based on the visit of the device from Household B to household C, Households A and C are connected in the second degree. Similarly, Household B has no $2^{nd}$ degree connections (assuming no other visits have occurred) based on the direct visits of the device from Household A to B and the device from Household B to Household C.

If/when reciprocal visits occur, a stronger connection may be identified. For example, referring to FIG. 4, if, in addition to the device from Household A visiting Household B, a device from Household B also visits Household A. A stronger connection may be established. Such a stronger connection may have a stronger/weighted influence. Similarly, if the same visit of the device from Household A to Household B occurs multiple times (e.g., meets a threshold number of visits) (regardless of the number of reciprocal visits from B to A), a stronger connection may be established compared to that of a single visit. Accordingly, in addition to degrees of separation, different levels or weightings of the connections may be achieved (e.g., based on the conduct of devices in each household).

Targeting

Targeting options may be provided for where to use the data from. For example, embodiments of the invention may enable targeting based on the degrees of separation from a primary household/user. As used herein, the primary household refers to the household where a user/device originates (also referred to as a home household). For example, targeting/targeted advertisements may be based on data/preference/attributes of the primary household, households 1 degree from the primary household, households 2 degrees from the primary household, etc. In other words, if targeting based on data 1 degree from the primary household, data from the profile of households that are 1 degree separated from the primary household are used. Similarly, if targeting based on 2 degrees of separation, data from the profiles of households 2 degrees (or less) separated from the primary household would be used to perform the targeting.

As described above, in addition to utilizing data based on the degrees of separation, depending on the frequency/number of visits, such data may be weighted more/less heavily when performing the targeting.

Reporting

Figure 5:
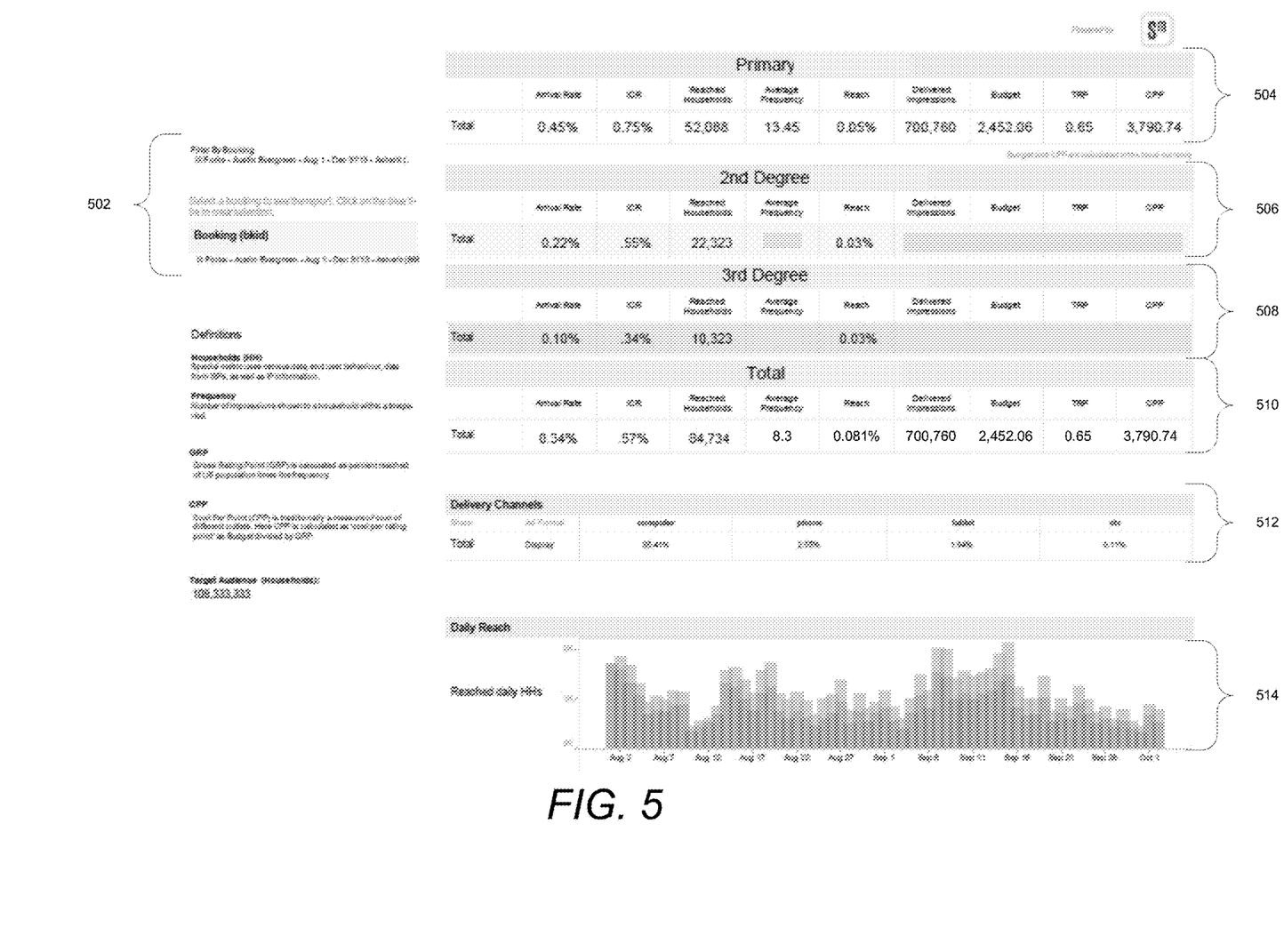
FIG. 5 illustrates an exemplary report/interactive reporting display provided in accordance with one or more embodiments of the invention.

In addition to targeting/targeted advertising, reports may be provided to users and may separate information based on degrees of separation. Such reporting provides householding metrics for the reach of households that are provided with the targeted advertising/media content. For example, FIG. 5 illustrates an exemplary report/interactive reporting display provided in accordance with one or more embodiments of the invention. The invention is not limited to the report/interactive reporting display of FIG. 5 and a variety of different options and reporting capabilities are within the scope of the present invention. Filter selection area 502 provides the ability for a user to select/clear a "booking" (e.g., by clicking/selecting on a particular "booking"). A booking refers to a purchased advertising package or an order for an ad impression against which the advertiser ad can be shown.

Sections/categories 504, 506, 508, and 510 provide reports/statistical analysis for various advertisement properties based on data from the primary household 504, $2^{nd}$ degree household 506, $3^{rd}$ degree household 508, and total households 510. Each section/household category 504-510 provides columns for the advertising arrival rate (i.e., the rate at which advertisements are shown to viewers based on data from each category of household), the ICR (Influence Conversion Rate), the number of reached households (i.e., the number of households reached based on data from the category 504-510), the average frequency of the advertisement placement (i.e., the average rate for how often an advertisement was placed on a website/delivered to a user/device based on data from the category of separation), the reach of the advertisement (i.e., the percentage of total number of households in a region), the number of delivered impressions (i.e., based on data from the particular category of separation), the budget (i.e., the budget for delivering advertisements based on the particular category of separation), the TRP (target rating point) (i.e., one percent of everyone who is receiving an advertisement; TRP is calculated by multiplying the GRP [gross rating point] by the ratio of the target to the total audience); and the CPP (cost per point as defined above). As indicated in FIG. 5, the average frequency, delivered impressions, budget, TRP, and CPP may not be displayed for categories 506-508 as embodiments of the invention may not directly advertise to $2^{nd}$ and $3^{rd}$ degree households.

More specifically, the arrival rate is a count of unique visitations/households based on the particular category 504-510. For example, for category 504 (primary households), the arrival rate is the count of unique visitations (either clicked through or directly navigated to) of the brand's site from within an influenced house, divided by the count of unique households advertised to (the 52,088 number). Similarly, for categories 506 and 508, the arrival rate is the count of unique households directly navigating (non-advertised) and landing on the brand's site from within the $2^{nd}$ or $3^{rd}$ degree bucketed, divided by the count of unique households that were in touch of the primary households (within a set number of days after the primary households were advertised to). For category 510 (total influence), the arrival rate is the weighted average computation, meaning total unique visits divided by total unique households (Primary 504, $2^{nd}$ 506, and $3^{rd}$ 508).

The ICR is the count of unique conversions (newsletter signup, purchase, etc.—i.e., the specific action the advertiser is measuring that the consumer will take) on the advertiser site divided by the count of unique landings.

The average frequency is equal to the number of delivered impressions divided by the reached households (e.g., Average Frequency=DeliveredImpressions/Reached Households). For example, for category 504, the average frequency is 13.45 (=700,760/52,088). Similarly, reach has an implied denominator. For example, for category 504, 50,088/0.05%=104,176,000, which is close to the number of U.S. Households. As illustrated, the total 510 average frequency is 700,760/84,734=8.3 and the reach is 84,734/104,176,000=0.081%.

Section/area 512 breaks down the percentage of total advertisements delivered by the method of delivery (e.g., computer, phone, tablet, ctv [cable television], etc.). Area 514 provides bar graphs of the number of households reached on a daily basis. The bar graphs may be color coded based on the category of separation.

Logical Flow

Figure 6:
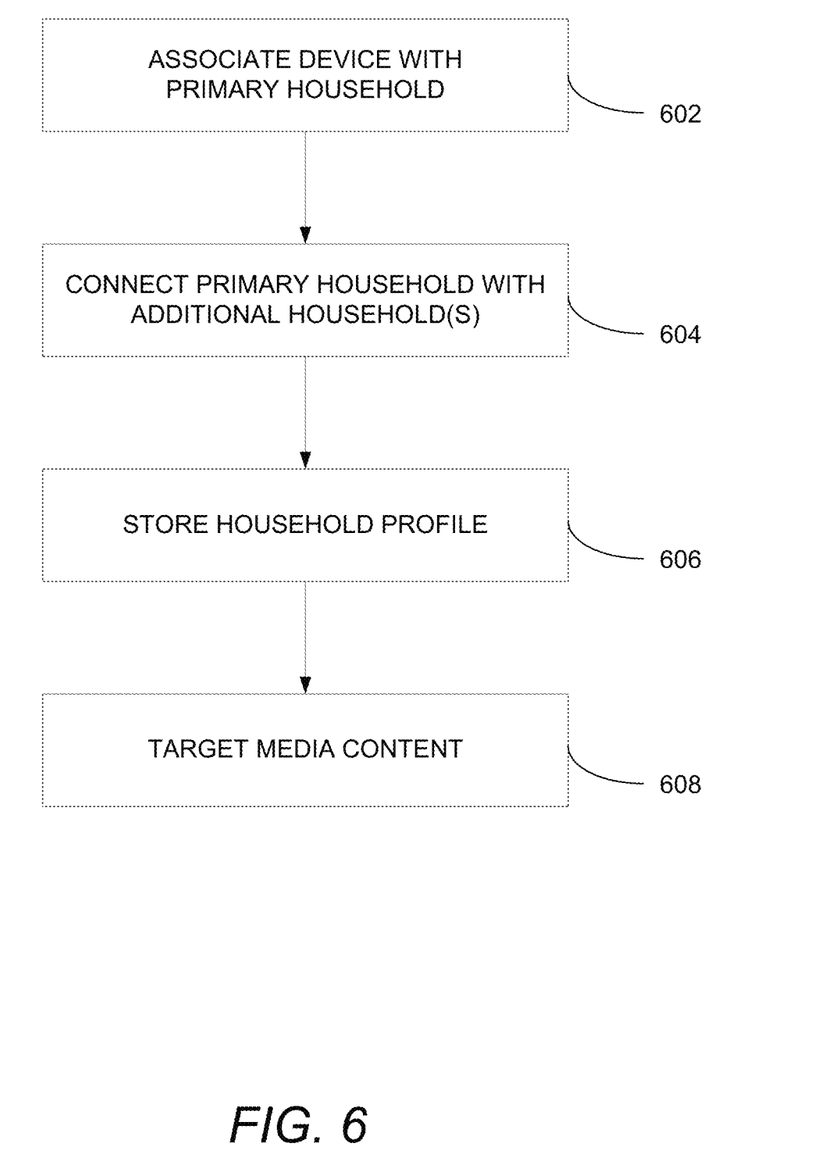
FIG. 6 illustrates the logical flow for utilizing household connections in accordance with one or more embodiments of the invention.

In view of the above, embodiments of the invention provide the ability to identify connections and levels of separation in such connection between devices/households. Based on the connections, targeting and reporting are provided. FIG. 6 illustrates the logical flow for utilizing household connections in accordance with one or more embodiments of the invention.

At step 602, a device (e.g., mobile phone, tablet, mobile computer, etc.) is associated with a primary/home household.

At step 604, the primary household is connected with one or more additional households. To connect households, a primary IP address of the primary household may be determined. Thereafter, secondary IP addresses of the additional households are determined (e.g., based on visits of the device to the additional households). Alternatively (or in addition), the primary household may be connected with the additional households based on connections within a social media network.

At step 606, a household profile is stored. Within a primary household profile, identification information for each of the additional connected households is stored. The identification information may consist of separation information for each of the additional households indicating a degree of separation of each additional household (from the primary household). In addition, based on removal criteria, identification information (for one or more connected households) may be removed from the household profile.

At step 608, media content (e.g., advertising, movies, programming [audio/video/television/etc.], web sites, blog suggestions, etc.) is targeted to the user/device based on data associated with the primary household and data associated with the connected households identified in the household profile. The targeting may include providing a targeting option for utilizing data based on a specified degree of separation (e.g., $1^{st}$ degree, $2^{nd}$ degree, etc.). Such identification information may be stored upon a first visit of the device to the one of the one or more connected households.

In an exemplary embodiments, a first user on a mobile phone may be associated with a first home (i.e., the first user's primary household). The first user may be exposed to specific advertisements within the primary household such as advertisements for L'OREAL™ cosmetics, TOYOTA™ automobiles, CAMPBELLS™ soup, etc. (e.g., based on interactions with other members and devices of the primary household). The first user may then visit a friend's home (e.g., to pick up a date, watch a football game, etc.). Based on the advertising shown to the first user, other users within the friend's home may be exposed to similar advertisements (e.g., the friend may be exposed to a CAMPBELL'S™ soup advertisement. Further, the first user may also be exposed to an advertising campaign and/or additional advertisements across multiple devices at the friend's house. For example, if the first user was presented with a L'OREAL™ cosmetics advertisement at home, a similar ad (e.g., for L'OREAL™ cosmetics or another cosmetic company) may be shown on a television within the friend's home. In this regard, consistent and repeated advertisements that are part of the same advertising campaign may be carried across household boundaries.

Similarly, advertisements/media content shown to and/or associated with the friend's household may be used to influence advertisements/media content shown to the first user. For example, the first user may not have been previously targeted with advertising from a bicycle retailer (e.g., SCHWINN™ bicycles). However, if the friend's household had previously made a purchase of a SCHWINN™ bicycle, once the first user is connected with the friend's household (e.g., based on a visit by the first user to the friend's house), SCHWINN™ bicycle advertisements may be presented/targeted to the first user (e.g., on the first user's mobile device, on televisions within the first household, etc.).

As part of or in addition to the targeting, householding metrics (for a reach of the households based on the media content provided) may be provided (e.g., via an interactive dashboard/website, a word processing document, an image file [e.g., portable document format—PDF], etc.).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for utilizing household connections, comprising:
   (a) a first device of a first person issuing a first hypertext transfer protocol (HTTP) request from a first internet protocol (IP) address, wherein the first HTTP request includes a first device identification;
   (b) a second device of a second person issuing a second HTTP request from a second IP address, wherein the HTTP request includes a second device identification;
   (c) a third device of a third person issuing a third HTTP request from a third IP address, wherein the third HTTP request includes a third device identification;
   (d) receiving in a server computer, the first HTTP request, the second HTTP request, and the third HTTP request;
   (e) determining, in the server computer, that three or more households are internet connected households comprising a primary household, a second household, and third household that are different households, wherein:
      (1) the determining is based on the first IP address, the second IP address, and the third IP address;
      (2) the first HTTP request is received from the primary household;
      (3) the second HTTP request is received from a second household; and
      (4) the third HTTP request is received from a third household;
      (5) each of the three or more households includes all persons that occupy a physical housing unit;
   (f) associating, in the server computer, the first device with the primary household, wherein the associating is based on the first HTTP request originating from the first device and the first device identification;
   (g) associating, in the server computer, the second device with the second household, wherein the associating is based on the second HTTP request originating from the second device and the second device identification;
   (h) associating, in the server computer, the third device with the third household, wherein the associating is based on the third HTTP request originating from the third device and the third device identification;
   (i) the second device issuing a fourth HTTP request from the first IP address, wherein the HTTP request includes the second device identification;
   (j) determining, in the server computer, based on the fourth HTTP request that that the second device has directly visited the primary household, wherein the second device directly visiting the primary household results in a determination of first separation information, wherein the first separation information provides that the second household has a 1 degree of separation from the primary household;
   (k) the third device issuing a fifth HTTP request from the second IP address, wherein the HTTP request includes the third device identification;
   (l) determining, in the server computer, based on the fifth HTTP request that the third device has directly visited the second household, wherein:
      (i) the third device directly visiting the second household results in a determination of second separation information;

(ii) the second separation information is calculated based on a number of connections between the third household and the primary household; and (iii) the number of connections is based on a direct visit from the second device to the primary household and the third device to the second household;

(m) electronically storing, within a primary household profile on the server computer:
(1) second household identification information for the second household;
(2) third household identification information for the third household; and
(3) the first separation information for the second household identification information; and
(4) the second separation information for the third household identification information;

(n) receiving a request to target users based on a specified degree of separation from the primary household;

(o) targeting, via the computer, and based on the request to target users and the determining that the third household is the specified degree of separation, digital media content to the first device based on one or more attributes of the one or more persons that occupy the third additional household identified in the primary household profile.

2. The computer-implemented method of claim 1, further comprising:
determining, in the server computer, attributes of the first person and the third person;
determining, in the server computer, that the first person and the third person have a minimum first threshold of attributes in common between them, wherein the minimum first threshold of attributes in common between the first person and the third person is based on connections within a social media network; and
connecting, in the server computer, the primary household with the third household based on the determining that the first person and the third person have the minimum first threshold of attributes in common between them;
wherein the targeting is further based on the minimum first threshold of attributes in common.

3. The computer-implemented method of claim 1, further comprising:
determining, in the server computer, attributes of the first person and the second person;
determining, in the server computer, that the first person and the second person have a minimum first threshold of attributes in common between them;
connecting, in the server computer, the primary household with the second household based on the determining that the first person and the second person have the minimum first threshold of attributes in common between them;
wherein:
the targeting is further based on the minimum first threshold of attributes in common;
the first threshold of attributes in common between the first person and the second person is based on one or more visits of the first device to the second household;
the second household identification information is stored upon the first visit, of the one or more visits, of the first device to the second household.

4. The computer-implemented method of claim 1, further comprising:
determining, in the server computer, attributes of the first person and the second person;

determining, in the server computer, that the first person and the second person have a minimum first threshold of attributes in common between them;
connecting, in the server computer, the primary household with the second household based on the determining that the first person and the second person have the minimum first threshold of attributes in common between them;
wherein:
the targeting is further based on the minimum first threshold of attributes in common;
the first threshold of attributes in common between the first person and the second person is based on a combination of:
one or more visits of the first device to the second household; and
social network connections between the first person and the second person.

5. The computer-implemented method of claim 1, further comprising:
determining, in the server computer, attributes of the first person and the second person;
determining, in the server computer, that the first person and the second person have a minimum first threshold of attributes in common between them;
connecting, in the server computer, the primary household with the second household based on the determining that the first person and the second person have the minimum first threshold of attributes in common between them;
wherein:
the targeting is further based on the minimum first threshold of attributes in common;
the first threshold of attributes in common between the first person and the second person is based on secondary factors in common between the first person and the second person.

6. The computer-implemented method of claim 5, wherein the first person is connected to the second person based on a minimum threshold of secondary factors in common between the first person and the second person.

7. The computer-implemented method of claim 5, wherein the secondary factors comprise properties for purchases made by the first person and the second person.

8. The computer-implemented method of claim 1, further comprising:
removing the second household identification information from the primary household profile based on removal criteria.

9. The computer-implemented method of claim 1, wherein the digital media content comprises advertising.

10. The computer-implemented method of claim 1, further comprising:
providing householding metrics for a reach of the third household based on the media content provided.

11. A computer-implemented system for utilizing household connections comprising:
(a) a first device of a first person issuing a first hypertext transfer protocol (HTTP) request from a first internet protocol (IP) address, wherein the first HTTP request includes a first device identification;
(b) a second device of a second person issuing a second HTTP request from a second IP address, wherein the second HTTP request includes a second device identification;

(c) a third device of a third person issuing a third HTTP request from a third IP address, wherein the third HTTP request includes a third device identification;
(d) a server computer having a memory;
(e) a processor executing on the server computer;
(f) the memory storing a set of instructions, wherein the set of instructions, when executed by the processor cause the processor to perform operations comprising:
 (i) receiving, the first HTTP request, the second HTTP request, and the third HTTP request;
 (ii) determining that three or more households are internet connected households comprising a primary household, a second household, and a third household that are different households, wherein:
  (1) the determining is based on the first HTTP request, the second HTTP request, and the third HTTP request;
  (2) the first HTTP request is received from the primary household;
  (3) the second HTTP request is received from a second household; and
  (4) the third HTTP request is received from a third household; and
  (5) each of the three or more households includes all persons that occupy a physical housing unit;
 (iii) associating the first device with the primary household, wherein the associating is based on the first HTTP request originating from the first device and the first device identification;
 (iv) associating the second device with the second household, wherein the associating is based on the second HTTP request originating from the second device and the second device identification;
 (v) associating the third device with the third household, wherein the associating is based on the third HTTP request originating from the third device and the third device identification;
 (vi) receiving, from the second device, a fourth HTTP request from the first IP address, wherein the HTTP request includes the second device identification;
 (vii) determining, based on the fourth HTTP request, that that the second device has directly visited the primary household, wherein the second device directly visiting the primary household results in a determination of first separation information, wherein the first separation information provides that the second household has a 1 degree of separation from the primary household;
 (viii) receiving, from the third device, a fifth HTTP request from the second IP address, wherein the HTTP request includes the third device identification;
 (ix) determining, based on the fifth HTTP request, that the third device has directly visited the second household, wherein:
  (1) the third device directly visiting the second household results in a determination of second separation information;
  (2) the second separation information is calculated based on a number of connections between the third household and the primary household; and
  (3) the number of connections is based on a direct visit from the second device to the primary household and the third device to the second household;
 (x) electronically storing, within a primary household profile:
  (1) second household identification information for the second household;
  (2) third household identification information for the third household; and
  (3) the first separation information for the second household identification information; and
  (4) the second separation information for the third household identification information;
 (xi) receiving a request to target users based on a specified degree of separation from the primary household;
 (xii) targeting, based on the request to target users and the determining that the third household is the specified degree of separation, digital media content to the first device based on one or more attributes of the one or more persons that occupy the third additional household identified in the primary household profile.

12. The computer-implemented system of claim 11, further comprising:
 determining attributes of the first person and the third person;
 determining that the first person and the third person have a minimum first threshold of attributes in common between them, wherein the minimum first threshold of attributes in common between the first person and the third person is based on connections within a social media network; and
 connecting the primary household with the third household based on the determining that the first person and the third person have the minimum first threshold of attributes in common between them;
 wherein the targeting is further based on the minimum first threshold of attributes in common.

13. The computer-implemented system of claim 11, further comprising
 determining attributes of the first person and the second person;
 determining that the first person and the second person have a minimum first threshold of attributes in common between them;
 connecting the primary household with the second household based on the determining that the first person and the second person have the minimum first threshold of attributes in common between them;
 wherein:
  the targeting is further based on the minimum first threshold of attributes in common;
  the first threshold of attributes in common between the first person and the second person is based on one or more visits of the first device to the second household;
  the second household identification information is stored upon the first visit, of the one or more visits, of the first device to the second household.

14. The computer-implemented system of claim 11, further comprising:
 determining attributes of the first person and the second person;
 determining that the first person and the second person have a minimum first threshold of attributes in common between them;
 connecting the primary household with the second household based on the determining that the first person and the second person have the minimum first threshold of attributes in common between them;

wherein:
  the targeting is further based on the minimum first threshold of attributes in common;
the first threshold of attributes in common between the first person and the second person is based on a combination of:
  one or more visits of the first device to the second household; and
  social network connections between the first person and the second person.

15. The computer-implemented system of claim 11, further comprising:
  determining attributes of the first person and the second person;
  determining that the first person and the second person have a minimum first threshold of attributes in common between them;
  connecting the primary household with the second household based on the determining that the first person and the second person have the minimum first threshold of attributes in common between them;
wherein:
  the targeting is further based on the minimum first threshold of attributes in common;
  the first threshold of attributes in common between the first person and the second person is based on secondary factors in common between the first person and the second person.

16. The computer-implemented system of claim 15, wherein the first person is connected to the second person based on a minimum threshold of secondary factors in common between the first person and the second person.

17. The computer-implemented system of claim 15, wherein the secondary factors comprise properties for purchases made by the first person and the second person.

18. The computer-implemented system of claim 11, further comprising:
  removing the second household identification information from the primary household profile based on removal criteria.

19. The computer-implemented system of claim 11, wherein the digital media content comprises advertising.

20. The computer-implemented system of claim 11, wherein the operations further comprise:
  providing householding metrics for a reach of the third household based on the media content provided.

* * * * *